(12) United States Patent
Lopez

(10) Patent No.: US 12,710,270 B1
(45) Date of Patent: Aug. 18, 2026

(54) ENABLING MOBILE CAMERA CALIBRATION

(71) Applicant: Universal Calibration and Diagnostics LLC, Tampa, FL (US)

(72) Inventor: Luis Lopez, Tampa, FL (US)

( * ) Notice: Subject to any disclaimer, the term of this patent is extended or adjusted under 35 U.S.C. 154(b) by 568 days.

(21) Appl. No.: 18/117,751

(22) Filed: Mar. 6, 2023

Related U.S. Application Data

(60) Provisional application No. 63/316,425, filed on Mar. 4, 2022, provisional application No. 63/316,426, filed on Mar. 4, 2022.

(51) Int. Cl.
*G01B 11/275* (2006.01)
*H04N 17/00* (2006.01)

(52) U.S. Cl.
CPC ....... *G01B 11/2755* (2013.01); *H04N 17/002* (2013.01); *B60W 2420/403* (2013.01); *G06T 2207/30252* (2013.01)

(58) Field of Classification Search
None
See application file for complete search history.

(56) References Cited

U.S. PATENT DOCUMENTS

2019/0187249 A1* 6/2019 Harmer ..................... G01S 7/40
2021/0387637 A1 12/2021 Rogers et al.
2022/0049954 A1* 2/2022 Lai .......................... G01S 7/497
2022/0234596 A1* 7/2022 Jefferies ................ B60W 50/04

OTHER PUBLICATIONS

Autel, "ADAS MA600 System Packages," Aug. 29, 2019.

* cited by examiner

*Primary Examiner* — Ladimir Magloire
*Assistant Examiner* — Ashley Brown Raynal
(74) *Attorney, Agent, or Firm* — Canady & Lortz LLP; Bradley K. Lortz

(57) ABSTRACT

Cameras can be used in applications that provide measurements of objects in the field of view. These applications can include advanced driver assistance systems (ADAS). Cameras used this way may require calibration in order to correctly map offsets in the camera image to measurements in the environment. This calibration may involve imaging a known target with a known position and orientation relative to the camera and known patterns on the target. It may be desirable to bring the target to the location of the camera, rather than bringing the camera to the location of the vehicle. The present invention provides a mobile calibration stand for enabling the accurate positioning of a calibration target relative to a vehicle in order to successfully calibrate a camera associated with the vehicle.

10 Claims, 12 Drawing Sheets

ENABLING MOBILE CAMERA CALIBRATION

CROSS-REFERENCE TO RELATED APPLICATIONS

This application claims the benefit under 35 U.S.C. § 119 (e) of the following U.S. provisional patent applications, which are both incorporated by reference herein:

U.S. Provisional Patent Application No. 63/316,426 filed Mar. 4, 2022, by Lopez and entitled "SYSTEMS FOR ENABLING MOBILE CAMERA CALIBRATION".

U.S. Provisional Patent Application No. 63/316,425 filed Mar. 4, 2022, by Lopez and entitled "METHODS FOR ENABLING CAMERA CALIBRATION IN ADVERSE AMBIENT LIGHTING CONDITIONS".

BACKGROUND OF THE INVENTION

1. Field of the Invention

This invention relates to the calibration of a camera using a calibration target. Particularly, this invention relates to the calibration of a camera using a calibration target as may be used in automotive applications such as advanced driver assistance systems (ADAS).

2. Description of the Related Art

Cameras can be used in applications that provide measurements of objects in the camera field of view, so-called metric camera applications. These applications can include, for example, photogrammetry, mapping, architecture, construction, and automotive use such as advanced driver assistance systems (ADAS).

Modern automobiles include numerous ADAS that can increase the safety and convenience of operating the vehicle, and can even prevent collisions due to driver error or inattentiveness. These systems can include, for example, adaptive cruise control (ACC), rear cross traffic alert (RCTA), automatic parking, automatic emergency braking (AEB), forward collision warning (FCW), lane departure warning (LDW), pedestrian protection systems, automatic headlight dimming, and traffic sign recognition (TSR). These ADAS systems can be implemented using cameras as sensors. Cameras have numerous advantages; for example, they can be less expensive and more reliable than other sensors, and they may have multiple manufacturing sources.

ADAS functions may require the ability to measure distances accurately. For example, an automatic emergency braking system may need to measure the distance of an obstacle in front of the vehicle over time in order to apply the braking system early enough to avoid a collision with the obstacle. In a camera-based system, this may require the accurate mapping of displacements in the image to distances in the environment. This mapping can be affected by a number of factors, including, for example, the position of the camera, the orientation of the camera, the focal length of the lens, the lens distortion, and the center of projection of the lens.

It may be possible to use a calibration procedure to provide the accurate mapping of the camera image to measurements in the environment. This calibration procedure can involve setting up a known calibration target, with a known pattern, at a known position and orientation relative to the camera and capturing an image of the target, then using the captured image of the known pattern to determine the effects of the factors affecting the mapping and adjusting the mapping to compensate for those factors. In automotive applications such as ADAS, the calibration procedure may involve setting up a calibration target, with a black and white pattern having known sizes, at a known distance and height in front of the vehicle, capturing an image of the target, and using the image to generate a correct mapping of image features to measurements in the environment.

The calibration procedure may be sensitive to the specific placement of the calibration target (or multiple targets) within the field of view of the camera. It may be desirable to control this positioning by very carefully positioning the calibration target(s) with respect to the camera using a precise geometric arrangement in a carefully controlled environment. For example, if the camera is in an automobile, a calibration stand may be constructed with fixed tracks to position the tires of the automobile, a level floor to align the automobile and the calibration target(s), and fixed mounts on a wall to position the target(s) in a known position relative to the automobile.

The MA600 system from Autel is a typical prior art ADAS calibration system. Although the system is intended to be portable, it still requires a lengthy setup and internal calibration to be used. Moreover, its portability is intended for it to be transported among locations for multi-location shops. It is not suitable for outdoor applications in sunlight. The system is also not efficient for mobile setup and use on site at a customer location.

U.S Patent Publication No. 2021/0387637, published Dec. 16, 2021, by Rogers et al., discloses systems and methods for calibrating and aligning automotive sensors, such as advanced driver assistance system (ADAS) sensors. Embodiments include a system having an image sensor mounted on a fixture in a known pose relative to the fixture. The image sensor is for viewing a target disposed on a vehicle and having a known pose relative to the vehicle, and for capturing image data of the target. A data processor is provided for performing the steps of calculating, using the image data, a pose of the target; calculating a pose of the image sensor relative to the vehicle using the calculated pose of the target; and generating instructions for positioning the fixture at a predetermined pose relative to the vehicle using the calculated pose of the image sensor relative to the vehicle.

In view of the foregoing, there is a need in the art for improved systems and methods for calibrating cameras. Particularly, there is a need for systems and methods for calibrating cameras in automotive applications such as those employing ADAS and when windshields or other glass may be replaced. In addition, there is a need for such systems and methods to enable on site glass installation with camera calibration. There is also a need for such systems and methods to operate without lasers. These and other needs are met by the present invention as detailed hereafter.

SUMMARY OF THE INVENTION

Cameras can be used in applications that provide measurements of objects in the field of view. These applications can include advanced driver assistance systems (ADAS). Cameras used this way may require calibration in order to correctly map offsets in the camera image to measurements in the environment. This calibration may involve imaging a known target with a known position and orientation relative to the camera and known patterns on the target. The present invention provides a mobile calibration stand for enabling the accurate positioning of a calibration target relative to a vehicle in order to successfully calibrate a camera associated with the vehicle.

Cameras used as described may require calibration in order to correctly map offsets in the camera image to measurements in the environment. This calibration may involve imaging a known target with a known position relative to the camera, within a tolerance.

It may be convenient or even required to calibrate a camera "in the field" with a mobile system that can be transported to the camera requiring calibration. The mobile calibration system may need to be simple to operate and set up, and may need to tolerate more handling and vibration than fixed calibration systems.

However, it may be desirable to calibrate the camera "in the field" without access to such a controlled environment. For example, replacing a windshield may require calibrating a camera for an ADAS system in the car that is mounted behind the new windshield, and it may be more convenient for a consumer to have the windshield replacement at their home rather than at a repair shop. In this scenario, the conditions for calibration may be much less controlled, involving a surface that is not perfectly level, the need to position the calibration target(s) relative to the automobile rather than the other way around, and the need to bring the calibration system to the automobile rather than the other way around. Embodiments of the present invention provides a mobile system for calibrating cameras that overcomes the issues previously described.

At least one aspect of the present disclosure is directed to systems and methods for calibrating a camera. In some embodiments, the system can include a calibration stand including a vertical support, a first horizontal support, and a first calibration target. The system can include a first configuration of the calibration stand to facilitate the calibrating of the camera. The system can include a second configuration of the calibration stand to facilitate transporting the calibration stand. The vertical support can be extended for the first configuration and collapsed for the second configuration. The first horizontal support can be extended for the first configuration and collapsed for the second configuration. The first calibration target can be attached to the first horizontal support for the first configuration and detached from the calibration stand for the second configuration.

In some embodiments, the system can also include a tripod base supporting the vertical support, which can include three leg assemblies, each which can include a foot that can include an adjustment to change the height of the leg assembly. In some embodiments, the system can also include a second horizontal support. The second horizontal support can be extended for the first configuration and collapsed for the second configuration.

In some embodiments, the system can also include a second calibration target. The second calibration target can be attached to the second horizontal support for the first configuration and detached from the calibration stand for the second configuration.

In some embodiments, the camera can be mounted behind a windshield of a vehicle. In some embodiments, the camera can be a sensor for an advanced driver assistance system (ADAS) of the vehicle.

In some embodiments, the system can also include a first tape measure and a bracket, which can include a vertical member and at least one horizontal member. The first tape measure can be attached to the second horizontal support for the first configuration and detached from the calibration stand for the second configuration. The vertical member can be aligned with a tire of the vehicle. At least one of the horizontal members can rest on the ground. A movable end of the first tape measure can be removably attached to one of the horizontal members.

In some embodiments, the system can also include a leveling mechanism attached to the first horizontal support, which can include at least one bubble level.

In some embodiments, the system can also include a second tape measure. The second tape measure can be attached to the first horizontal support for the first configuration and detached from the calibration stand for the second configuration. A movable end of the second tape measure can be extended to the ground below the calibration stand.

In some embodiments, the system can also include a retractable filament attached to the first horizontal support and a magnet attached to the end of the filament. The magnet can be removably attached to a hood of the vehicle.

In some embodiments, the first horizontal support can include a first section and a second section. The first section and the second section can be connected by a toggle latch and a hinge for the first configuration, but only connected by the hinge for the second configuration.

A typical embodiment of the invention can comprise a system for calibrating a camera, having a calibration stand having a central vertical support, a first horizontal support having a first pair of lockably extended and collapsable extensions, and a first calibration target; a first configuration of the calibration stand to facilitate the calibrating; and a second configuration of the calibration stand to facilitate transporting the calibration stand. The central vertical support is extended in the first configuration and collapsed for the second configuration, each of the first pair of lockably extended and collapsable extensions of the first horizontal support are locked and extended outward in opposing directions from the central vertical support in the first configuration and collapsed toward the central vertical support in the second configuration, and the first calibration target is attached to the first horizontal support on the first pair of extensions in the first configuration and detached from the calibration stand in the second configuration. In some embodiments, the first pair of lockably extended and collapsable extensions can be each connected by a toggle latch and a hinge in the first configuration and the first pair of lockably extended and collapsable extensions are only connected by the hinge with the toggle latch disconnected when collapsed in the second configuration.

In further embodiments, the system can include a tripod base supporting the central vertical support including three leg assemblies having a foot comprising an adjustment to change the height of the leg assembly. The system can also include a leveling mechanism attached to the first horizontal support, comprising at least one bubble level.

In some embodiments, the system can include a second horizontal support having a second pair of lockably extended and collapsable extensions; wherein the second second pair of lockably extended and collapsable extensions are each locked and extended outward in opposing directions from the central vertical support in the first configuration and collapsed toward the central vertical support in the second configuration. The second pair of lockably extended and collapsable extensions can each be connected by a toggle latch and a hinge in the first configuration and the second pair of lockably extended and collapsable extensions are only connected by the hinge with the toggle latch disconnected when collapsed in the second configuration. The system can further include a second calibration target; wherein the second calibration target is attached to the second horizontal support on the second pair of extensions for the first configuration and detached from the second horizontal support in the second configuration.

Typically, the system is employed wherein the camera is mounted behind a windshield of a vehicle and the camera can be a sensor for an advanced driver assistance system (ADAS) of the vehicle. The system can further include a primary tape measure and a tire alignment bracket comprising a vertical alignment member and a horizontal base member; wherein the primary tape measure is attached to the second horizontal support in the first configuration and detached from the calibration stand in the second configuration, the vertical alignment member is aligned with a tire of the vehicle, the horizontal base member rests on the ground, and a movable end of the primary tape measure is removably attached to the horizontal base member. The system can further include a retractable filament attached to the first horizontal support at the central vertical support; and a magnet attached to the end of the filament; wherein the magnet is removably attached to a hood of the vehicle and used to observe whether the calibration stand is correctly aligned and oriented with the vehicle.

In some embodiments, the system can include a secondary tape measure for each of the first pair of lockably extended and collapsable extensions of the first horizontal support; wherein the secondary tape measure is attached to each of the first pair of lockably extended and collapsable extensions of the first horizontal support in the first configuration and detached from the calibration stand in the second configuration, and a movable end of the secondary tape measure is extended to the ground below the calibration stand to measure the height of the first horizontal support member.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Figure 1:
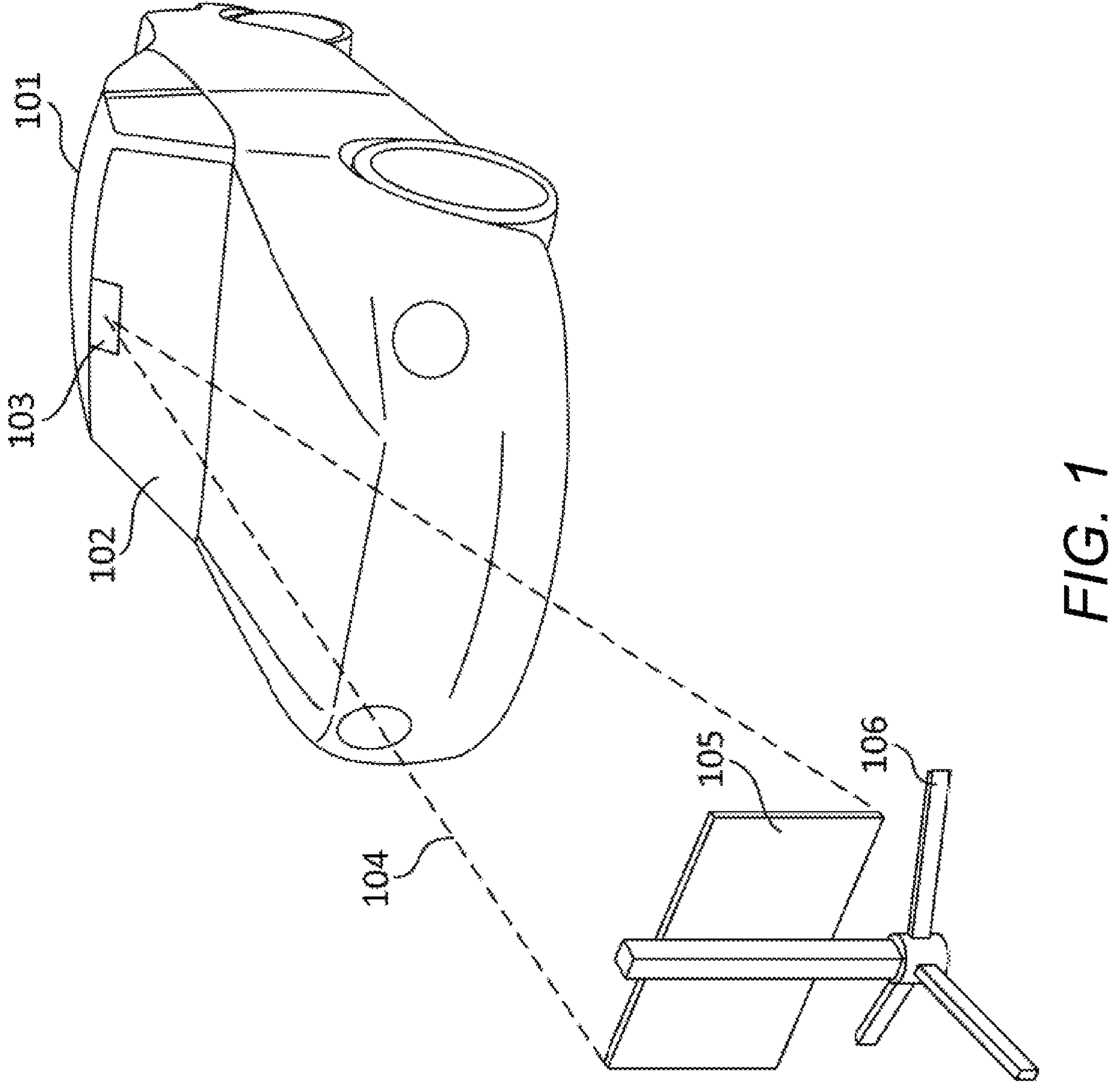
FIG. 1 is an illustrative diagram of an embodiment of the calibration of an automotive camera with a mobile calibration system.

As previously mentioned, cameras can be used in applications that provide measurements of objects in the field of view. These applications can include advanced driver assistance systems (ADAS). Cameras used this way may require calibration in order to correctly map offsets in the camera image to measurements in the environment. This calibration may involve imaging a known target with a known position and orientation relative to the camera and known patterns on the target. It may be desirable to bring the target to the location of the camera, rather than bringing the camera to the location of the vehicle. The present invention provides a mobile calibration stand for enabling the accurate positioning of a calibration target relative to a vehicle in order to successfully calibrate a camera associated with the vehicle.

One significant aspect for some embodiments of the invention includes eliminating any need for lasers. Embodiments of the present invention can operate without requiring any lasers for alignment of the automobile wheels or other components while calibrating the cameras of the ADAS. This is important to enable operation of the calibration process in outdoors in sunlight which would otherwise impair other calibration systems which employ lasers as the laser light can be washed out in sunlight. Employing one or more tape measures detachably affixed to the calibration stand enables checking alignment of the stand to the automobile without laser measuring. In addition, novel measuring brackets positioned at each of the automobile front wheels enable attachment of the measuring tape ends extended from the calibration stand to measure the calibration stand distance from the automobile.

In another significant aspect for embodiments of the invention employing optical calibration targets fixed in relation to one another on a rigid structure, setup of the calibration system is made much more efficient. Many other calibration systems employ different optical calibration targets which must be mounted to one or more structural supports. Such setups require calibrating the arrangement of optical targets in relation to one another before the system can then be used to calibrate cameras of the ADAS.

A further significant aspect for embodiments of the invention involve a novel collapsible calibration stand enabling easy transport to perform the ADAS calibration on site at a customer location. The collapsible stand can alternate between two configurations, a first for use calibrating and a second for transport. In the first configuration, each of two pairs of extensions (an upper and lower pair), are folded out and locked into position with latches and a vertical central support is extended between the upper and lower pair of extensions to form the stand for use calibrating with the lower end of the vertical central support mounted in a tripod base. Calibration targets are then temporarily affixed to the outer ends of the upper pair of extensions. Tape measures are temporarily affixed to each end of all the extensions. The tape measures at the ends of the lower pair of extensions are used to measure the distance to the automobile. The tape measures at the ends of the upper pair of extensions are used to measure the distance to the ground to check the height of the calibration targets. In the second configuration, each of the two pairs of extensions (the upper and lower pair), are folded in and the vertical central support is collapsed and removed from the tripod base to form a very compact unit for transport. In this configuration, the lower pair of extensions fold up toward the upper pair of extensions and the upper pair of extensions fold down over the folded lower pair of extensions.

2. Mobile Camera Calibration

Turning to the drawings, FIG. 1 is an illustrative diagram of an embodiment of the calibration of an automotive camera with a mobile calibration system. Vehicle 101 can have a camera 103 that can be mounted behind a windshield 102. The vehicle may be, for example, an automobile, truck, sport utility vehicle (SUV), or captive transit vehicle. The camera 103 may be, for example, a digital camera with a solid state sensor, and may be used for capturing, for example, still images or video. Further, the camera 103 may be used as a sensor for an application that requires mapping image elements from the camera into measurements of the real world, for example, distance or velocity measurements. In order to correct for variations in the mapping caused by, for example, the position of the camera 103, the orientation of the camera 103, the focal length of the lens of the camera 103, the distortion of the lens of the camera 103, and the center of projection of the lens of the camera 103, it may be necessary to use a calibration procedure. The calibration procedure may use a calibration target 105 mounted on a stand 106 in a known position relative to the vehicle 101, in the view 104 of the camera 103, and use the position of the target 105 and its pattern in an image captured by the camera 103 in order to adjust the mapping to provide correct measurements of the environment based on images captured by the camera 103.

The stand 106 may need to be mobile, in the sense that the stand 106 can be brought to the location of the vehicle 101 in order to do the calibration procedure, instead of the vehicle 101 being brought to the location of the stand 106 in order to do the calibration procedure. For example, the calibration procedure may be required after the replacement of a broken windshield 102, and the replacement process may be completed at the location of the vehicle 101 for the convenience of the owner. The owner may then wish to have the calibration procedure applied to the camera 103 after the replacement of the windshield 102, in order to make the operation of the vehicle 101 safe and avoid erratic behavior. Providing the use of the calibration stand 106 and calibration target 105 in this mobile fashion may require special considerations for adjusting the position and orientation of the stand 106, since the environment of the vehicle 101 may not have fixed references that could be available if the calibration procedure were completed in a more controlled environment.

Figure 2A:
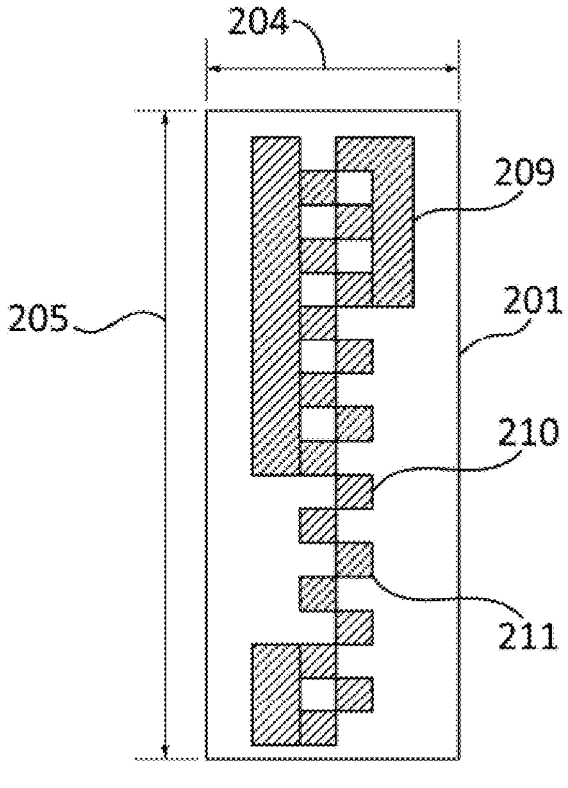
FIG. 2A is an illustrative diagram of a calibration target with a single component.

FIG. 2A is an illustrative diagram of an exemplary calibration target comprising a single pattern component. Note that FIG. 2A is intended to be representative and may not be drawn to scale. The calibration target 201 can have a fixed pattern 209 that is known to the calibration procedure implemented in software coupled to the camera 103. (As used in the present application, targets and distances that are "known" refers to being known to the calibration procedure implemented in software coupled to the camera in order to properly calibrate the actual distances between objects when viewed through the camera as will be understood by those skilled in the art.) The target 201 can have a known specific width 204 and specific height 205, and the pattern 209 can have known specific dimensions. The pattern 209 can include a plurality of elements, each having edges 210 and corners 211 that can facilitate locating components of the pattern 209 in an image captured by a camera (not shown). In this example, if the position and orientation of the target 201 is known relative to the camera, the details of the pattern 209 as located in the image can be used by the calibration procedure to adjust parameters in the camera to compensate for any distortions in the image that can be introduced by the optics of the camera or its environment. These factors can include, for example, the positioning of the camera, the orientation of the camera, the focal length of the lens, the lens distortion, the center of projection of the lens, chromatic aberration of the lens, distortion introduced by the curvature of the windshield in front of the camera, prismatic effects introduced by the windshield, and the distance of the camera from the windshield.

Figure 2B:
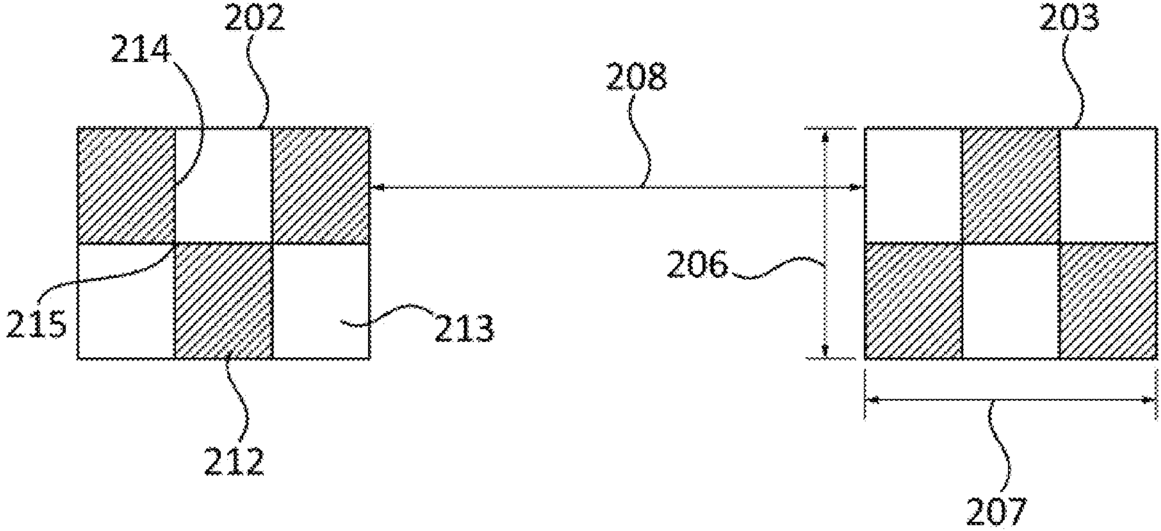
FIG. 2B is an illustrative diagram of a calibration target with two pattern components.

FIG. 2B is an illustrative diagram of another exemplary calibration target comprising two pattern components. Note that FIG. 2B is intended to be representative and may not be drawn to scale. The target can comprise two pattern components 202, 203. Each pattern component 202, 203 can have a known specific width 207 and specific height 206, and the two components 202, 203 can be separated by a known specific distance 208. The patterns on the components 202, 203 can have light areas such as 213 and dark areas 212. Note that the dark areas 212 may be completely black; the shading in FIG. 2B is meant to be indicative of a dark area rather than an exact rendition. The patterns on the components 202, 203 can have edges such as 214 and corners such as 215 that can facilitate locating the patterns in the components 202 and 203 in an image captured by a camera (not shown), in the same way as described for FIG. 2A. It may be advantageous to have a wider separation of the calibration target components 202 and 203 as compared to a single component 201, for example, in a stereo camera calibration where the field of view can be larger and the operation of the system can be more sensitive to smaller variations in the positioning of multiple cameras.

Figure 3:
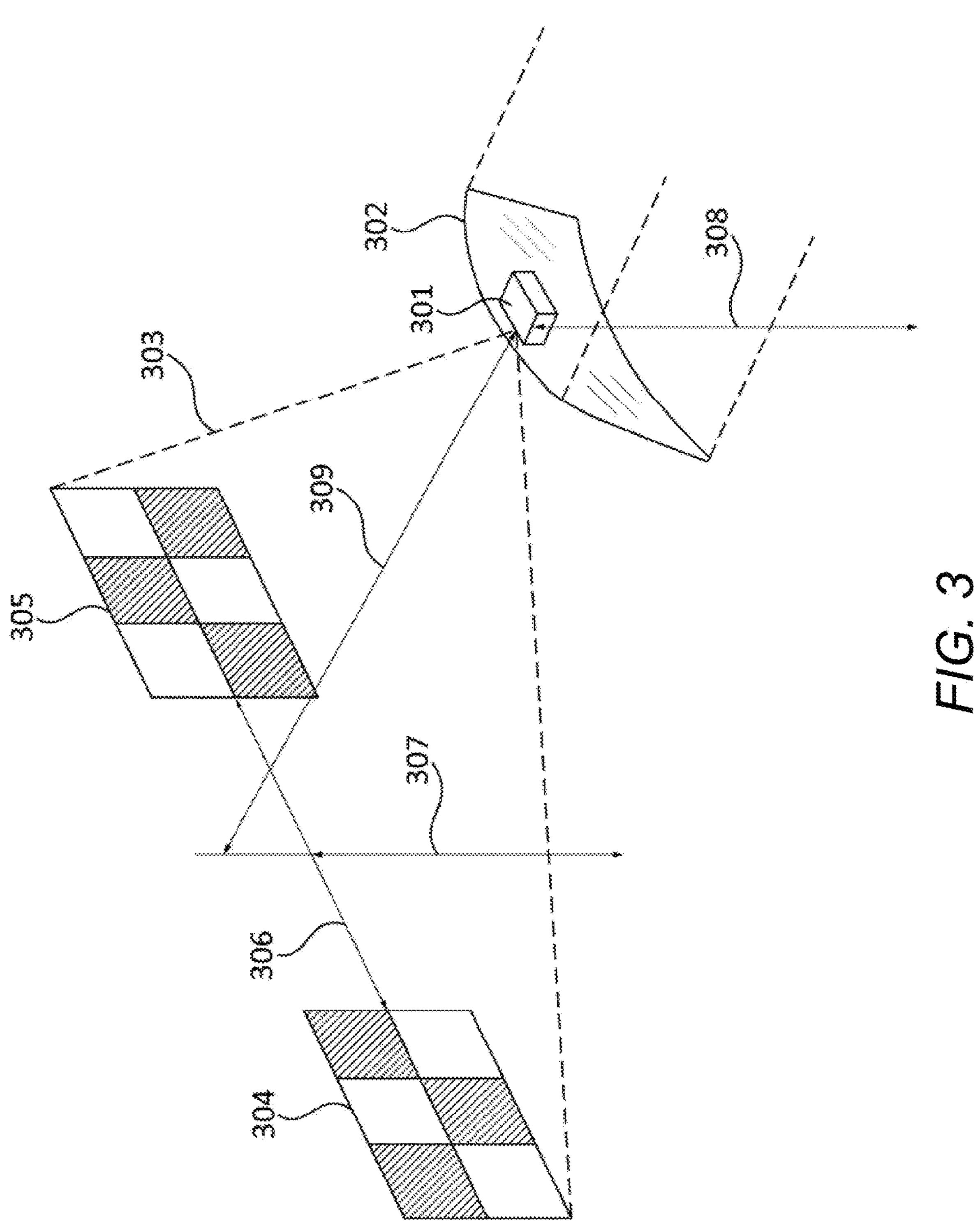
FIG. 3 is an illustrative diagram of the use of a calibration target with two pattern components to calibrate an automotive camera.

FIG. 3 is an illustrative diagram of the use of a calibration target comprising two pattern components to calibrate an automotive camera. The camera 301 can be located behind a windshield 302 of the vehicle with the two pattern components 304, 305 of the calibration target in the field of view 303 of the camera 301. The pattern components 304, 305 of the calibration target can be located at a known fixed distance 309 from the camera 301, a known fixed separation 306 from each other, and a known fixed height 307 from the ground. The calibration procedure can use the image of the calibration target components 304 and 305, as captured by the camera 301, to estimate the true height 308 of the camera 301 from the ground, as well as the true position and orientation of the camera 301 and the distortions of the image from the lens and external sources as previously described with respect to FIG. 2A.

Figure 4:
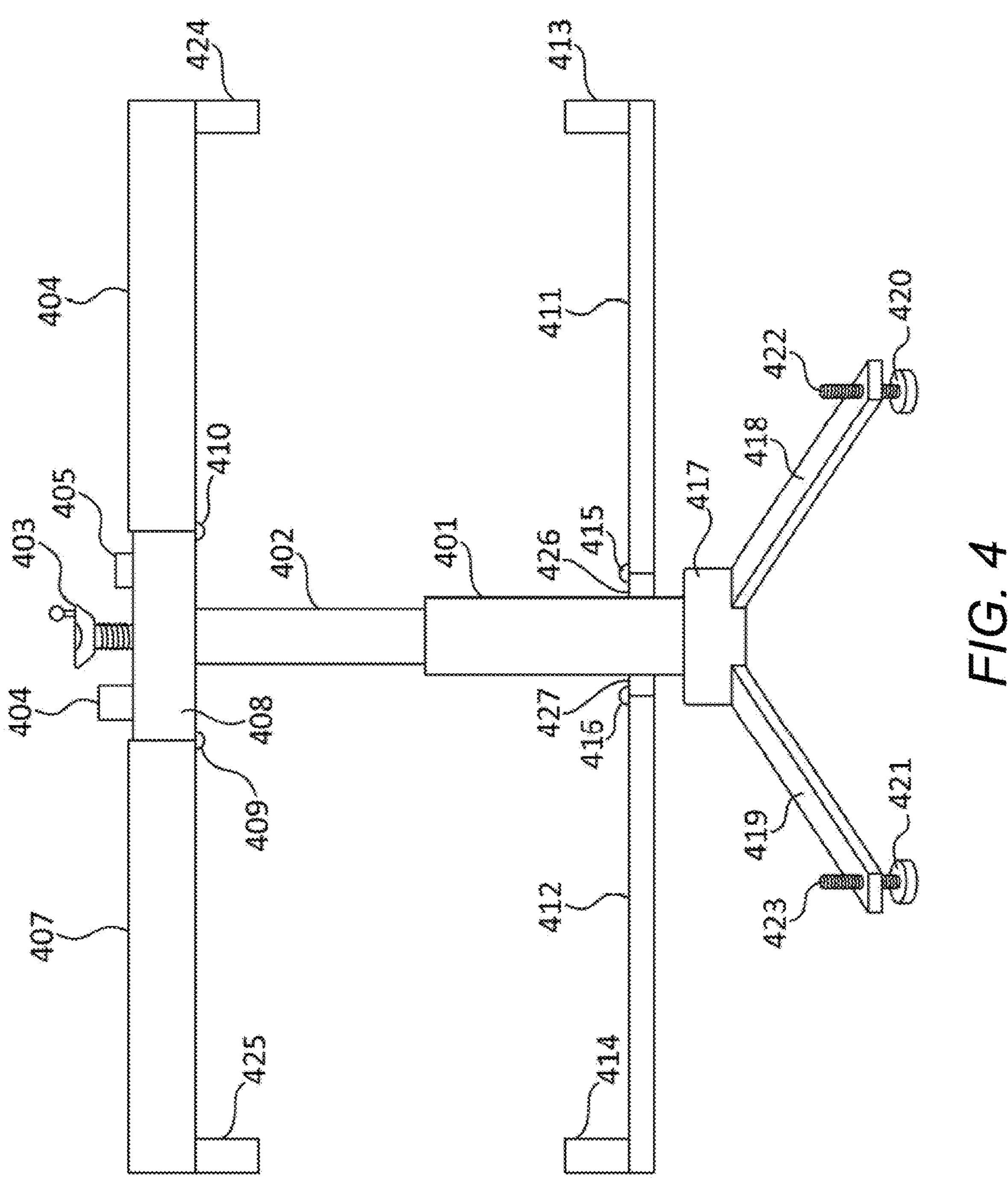
FIG. 4 is an illustrative diagram of a mobile calibration stand set up and ready for use.

FIG. 4 is an illustrative diagram of a mobile calibration stand set up and ready for use. Note that FIG. 4 is intended to be representative and may not be drawn to scale. The main support member for calibration targets can comprises a fixed bar 408 and two movable extensions 406, 407. The two extensions 406 and 407 can be attached to the fixed section 408 in a manner to temporarily lock the combination of extensions 406, 407, and fixed bar 408 into a rigid unit, as described in more detail with respect to FIGS. 11A-11D hereafter, to support the attachment of a calibration target as described hereafter with respect to FIGS. 12A-12B. For example, movable extension 407 may be attached to the fixed head 408 with a hinge 409 and movable extension 406 may be attached to the fixed bar 408 with a hinge 410. Accordingly, the movable extensions 406, 407 are movably attached to the fixed bar 408 and temporarily lockable (fixable) in relation to fixed bar 408.

Similarly, a secondary support member for calibration targets can be made up of fixed mounts 426, 427 and movable extensions (arms) 411, 412. The two extensions 411, 412 can be attached to the fixed mounts (holders) 426, 427 in a manner to temporarily lock the combination of extensions 411, 412, and fixed mounts 427, 426, into a rigid unit, as described in more detail hereafter with respect to FIGS. 11A-11D, to support the attachment of a calibration target as described hereafter with respect to FIGS. 12A-12B. For example, movable extension 412 may be attached to the mount 427 with a hinge 416 and movable extension 411 may be attached to the fixed mount 426 with a hinge 415.

Figure 5:
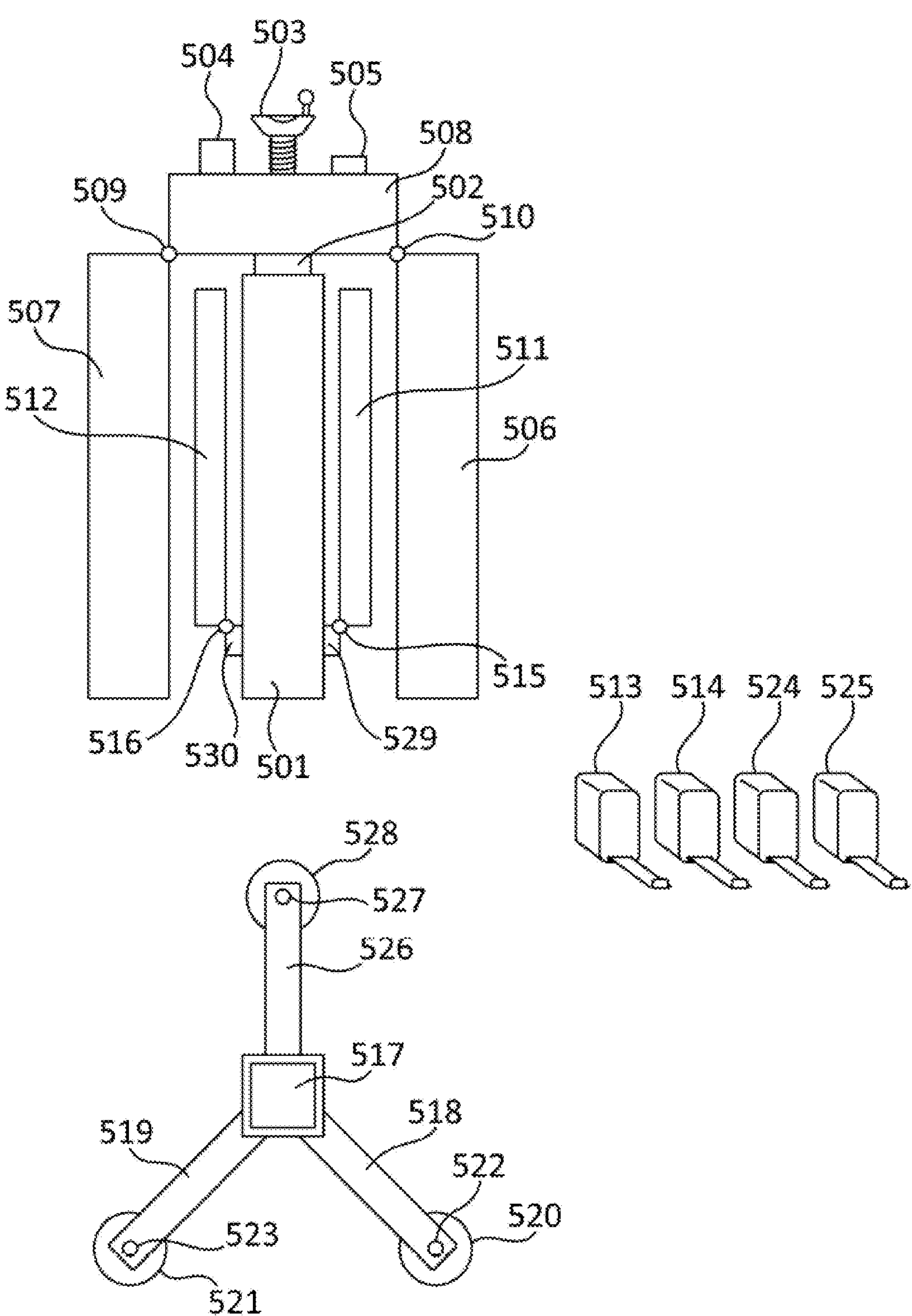
FIG. 5 is an illustrative diagram of a mobile calibration stand that is prepared for transportation.
Figure 6:
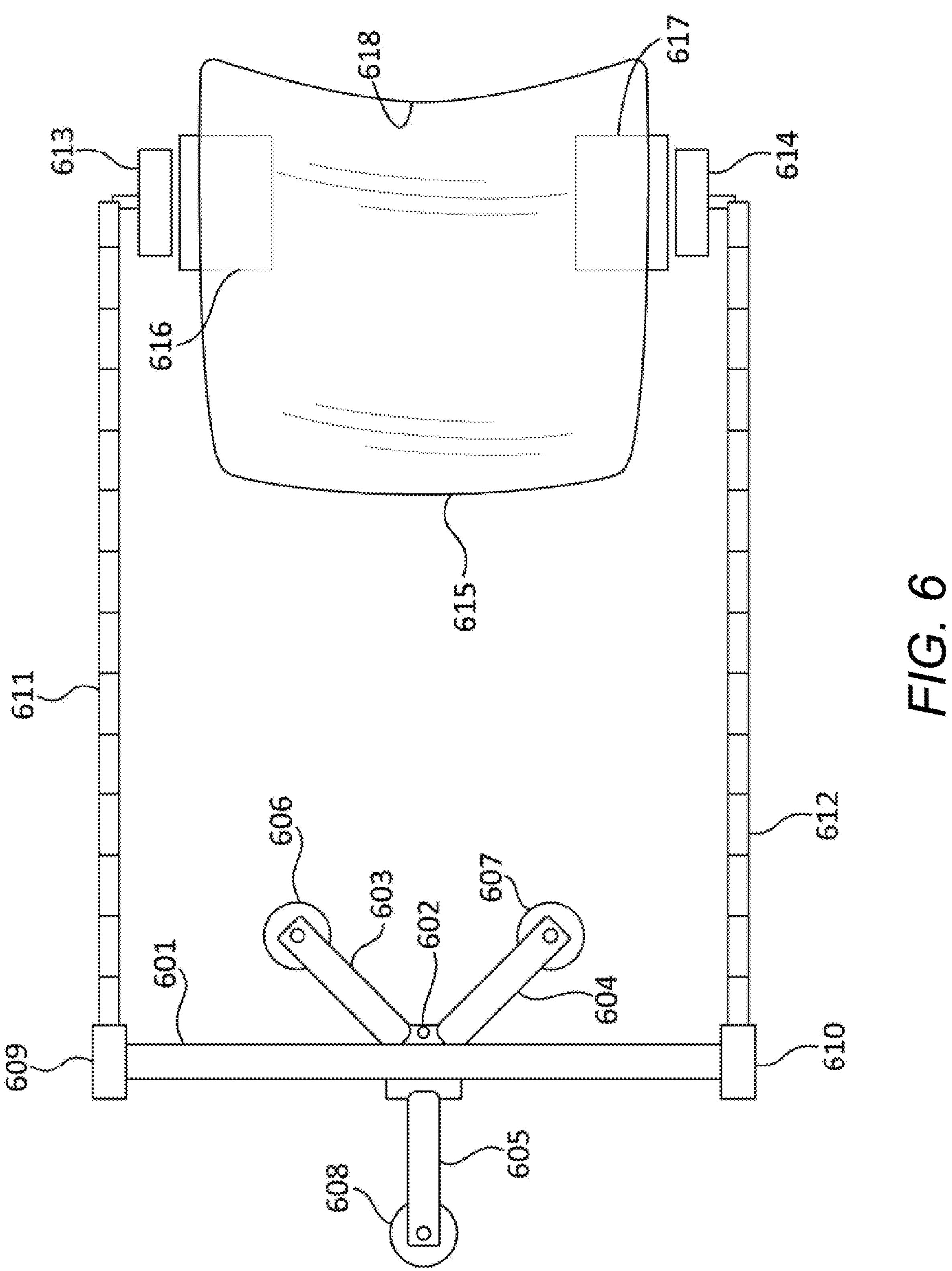
FIG. 6 is an illustrative diagram of an overhead view of the components of a mobile calibration stand used to adjust distance, positioning, and angle in front of an automobile.

The main support member (combining extensions 406, 407, and fixed bar 408), and the secondary support member (combining extensions 411, 412 and fixed mounts 427, 426), can both be attached to a vertical central support comprising an outer (lower) section 401 and an inner (upper) section 402 that can be extended from the outer section 401. The extension of the upper section 402 from the lower section 401 can be controlled by an adjustment screw (not shown—i.e. within the upper and lower sections 401, 402) that is rotatably fixed to the upper section 402 and threaded into the lower section 401 and set by turning handle 403. The vertical support of upper section 402 and lower section 401 can fit into a base 417 that is fixed to a tripod base. (Note: Only two legs of the tripod base are shown in FIG. 4 as the third leg is directly behind the base 417 and is not visible. For reference, see example tripod bases of FIGS. 5 and 6 illustrated from above.) The tripod base can be formed from legs 418, 419, which have feet 420, 421 coupled to adjustment screws 422, 423 threaded into the legs 418, 419 at their outer ends that can be adjusted as described in more detail later with respect to FIG. 8.

The main (upper) support member (combining extensions 407, 406, and fixed bar 408) can have a tape measure 424, 425 removably mounted at each distal end of the extensions 406, 407. These tape measures 424, 425 can be used to adjust the height of the main support member as described in more detail later with respect to FIG. 9. The main support member can also have a leveling mechanism 405 affixed to the top of the fixed bar 408 as described in more detail later with respect to FIG. 8. In addition, the main support can also have additional instrumentation 404 affixed to the top of the fixed bar 408, including a centering mechanism as described in more detail later with respect to FIGS. 10A-10B. The secondary (lower) support member (combining extensions 411, 412, and fixed mounts 427, 426), can also have tape measures 413, 414 removably mounted at each distal end of the extensions 411, 412. These tape measures 413, 414 can be used to adjust the position of the calibration stand relative to a vehicle as described in more detail later with respect to FIGS. 6-7. Removable mounting of the tape measures can be accomplished with screws, clips or any known suitable attachment mechanism.

FIG. 5 is an illustrative diagram of a mobile calibration stand (such as depicted prepared for use in FIG. 4) that is now prepared for transportation in a compact form. Note that FIG. 5 is intended to be representative and may not be drawn to scale. (Note also that the shading in FIG. 5 is intended only to clarify the solid components of the stand and is not intended to imply any functional significance.) The tape measures 513, 514, 524, and 525, which may correspond to the tape measures 413, 414, 424, and 425, respectively, of FIG. 4, can be removed from the stand for transport as shown. The upper section 502 of the vertical support, which may correspond to the upper section 402 of the vertical support in FIG. 4, can be fully collapsed into the lower section 501, which may correspond to the lower section 401 of the vertical support in FIG. 4. The lower support members 511 and 512, which may correspond to the lower support members (extensions) 411 and 412 in FIG. 4, can be moved to a storage position relative to the fixed support members 529 and 530, which may correspond to the fixed support members (mounts) 426 and 427 in FIG. 4. This may be done using the hinges 515 and 516, which may correspond to hinges 415 and 416 in FIG. 4. (Note that the axes of hinges, 415, 416, 515, 516 extend into the page as shown such that rotation of the extensions 411, 412, 511, 512 about the hinges 415, 416, 515, 516 is upward as shown.)

Other storage techniques are discussed hereafter with respect to FIGS. 11A-11D. The upper support members 506 and 507, which may correspond to the upper support members (extensions) 406 and 407 in FIG. 4, can be moved to a storage position relative to the fixed support member 508, which may correspond to the fixed support member (bar) 408 in FIG. 4. This may be done using the hinges 509 and 510, which may correspond to the hinges 409 and 410 in FIG. 4. (Note that the axes of hinges, 409, 410, 509, 510 extend into the page as shown such that rotation of the extensions 406, 407, 506, 507 about the hinges 409, 410, 509, 510 is downward as shown.) The leveling mechanism 505, which may correspond to the leveling mechanism 405 in FIG. 4, the instrumentation 504, which may correspond to the instrumentation 404 in FIG. 4, and the vertical adjustment handle 503, which may correspond to the vertical adjustment handle 403 in FIG. 4, can remain affixed to the fixed bar 408 for storage and transportation.

The base 517, which may correspond to the base 417 in FIG. 4, can be removed from the lower section 501 of the vertical support. The tripod base can comprise the base 517 with three legs 518, 519, and 526, three feet 520, 521, and 528, and three adjustment screws 522, 523, and 527. The legs 518, 519, and 526 may correspond to the legs 419 and 419 in FIG. 4, the feet 520, 521, and 528 may correspond to the feet 420 and 421 in FIG. 4, and the adjustment screws 522, 523, and 527 may correspond to the adjustment screws 422 and 423 in FIG. 4. The tripod base can be stored and transported separately along with the tape measures and the calibration stand.

FIG. 6 is an illustrative diagram of an overhead view of the components of a mobile calibration stand arranged to adjust distance, positioning, and angle in front of an automobile. The goal of the adjustment can be to position the calibration stand so that the lower support member 601 is a specific distance from the tires 616 and 617 of the vehicle and is parallel to the average position of the hood 615 and windshield 618 of the vehicle. The tape measures 609 and 610 attached to the lower support member 601 of the stand can be extended and attached to the brackets 613 and 614, which are described in more detail later with respect to FIG. 7 and can be used to align the ends of the tape measures 609 and 610 with the centers of the tires 616 and 617. The distances 611 and 612 can be read from the tape measures 609 and 610, and the entire stand can be positioned by moving the tripod base made up of support 602, legs 603, 604 and 605, and feet 606, 607, and 608 until the two distances 611 and 612 are the same and are the desired fixed distance of the calibration stand from the tires 616 and 617.

Figure 7:
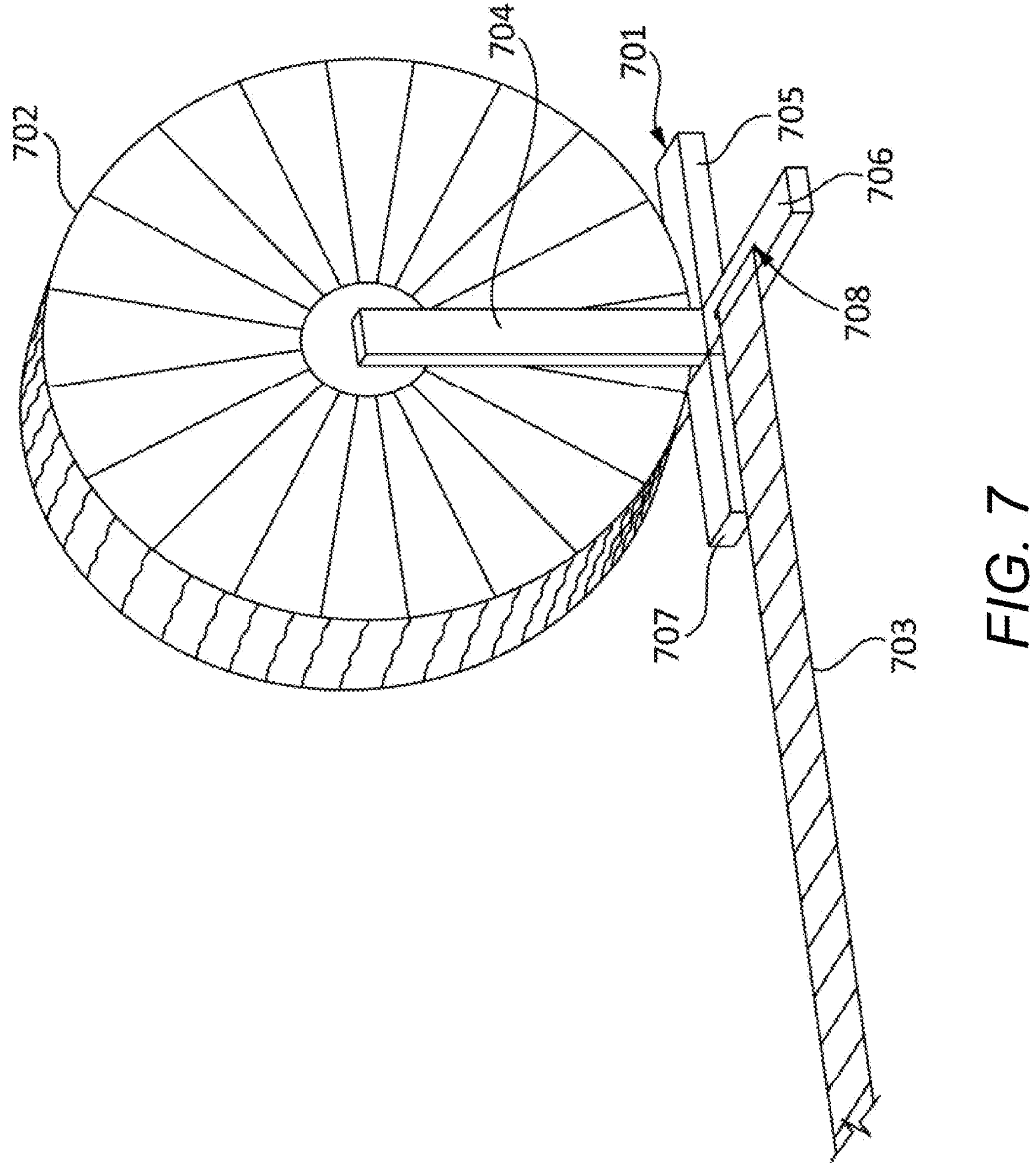
FIG. 7 is an illustrative diagram of a bracket used to align a mobile calibration stand with a tire on an automobile.

FIG. 7 is an illustrative diagram of a bracket used to align a mobile calibration stand with a tire (or wheel) on an automobile. The bracket 701 can comprise a vertical member 704 affixed to horizontal members 705, 706, and 707 that rest on the ground and support the bracket 701. In proper position adjacent to the tire 702, the vertical member 704 can be visually aligned with the center of the tire 702. Horizontal member 706 can have a slot 708 aligned with the center of the tire 702 that is designed to hold the end of a tape measure 703 to provide a precise distance of the tire center with respect to the target stand. The weight of the bracket 701 can be selected to make it light enough to move and transport conveniently, but suitably heavy enough to remain in the same position when tensioning and adjusting the tape measure 703. Moreover, the horizontal members 705, 706, and 707 may have a coating (such as rubber or a suitable polymer) that increases the friction with the ground and holds the bracket 701 in place more effectively when tensioning and adjusting the tape measure 703.

Figure 8:
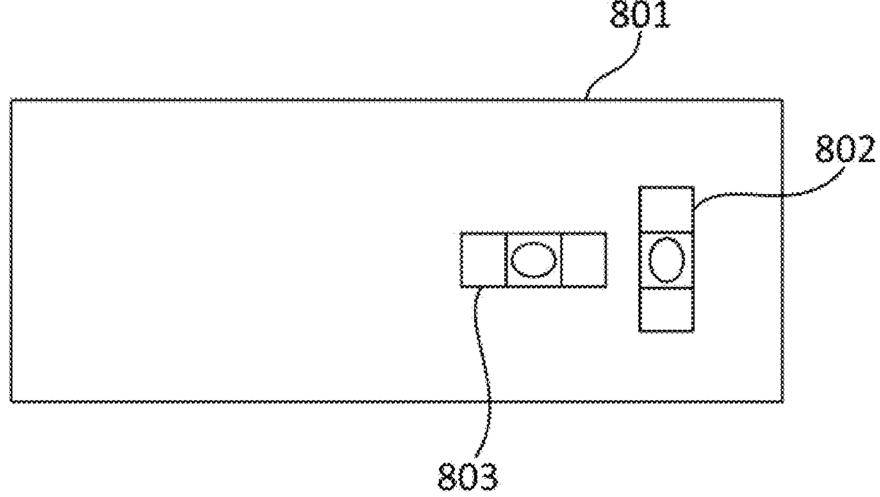
FIG. 8 is an illustrative diagram of the components of a mobile calibration stand used to adjust the stand to be level.
Figure 8:
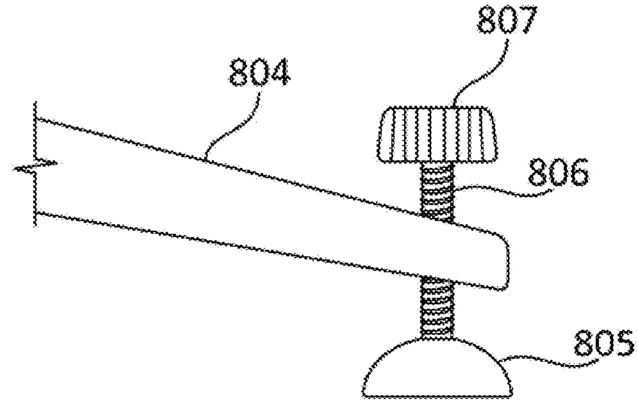

FIG. 8 is an illustrative diagram of the components of a mobile calibration stand used to adjust the stand to be level. Conventional bubble levels 802 and 803 arranged orthogonally to one another, each having a small bubble in a liquid carrier, can be mounted on the fixed upper component 801 of the stand (not shown), which may correspond to the fixed upper component 408 in FIG. 4. Each tripod leg 804, which may correspond to the legs 418 and 419 in FIG. 4, can have a foot 805, which may correspond to the feet 420 and 421 in FIG. 4, connected to an adjustment screw 806, which may correspond to the adjustment screws 422 and 423 in FIG. 4. By using the handle 807 to turn the adjustment screw 806 independently on each tripod leg and observing the result in the bubble levels 802 and 803, the stand can be adjusted to a level position.

Figure 9:
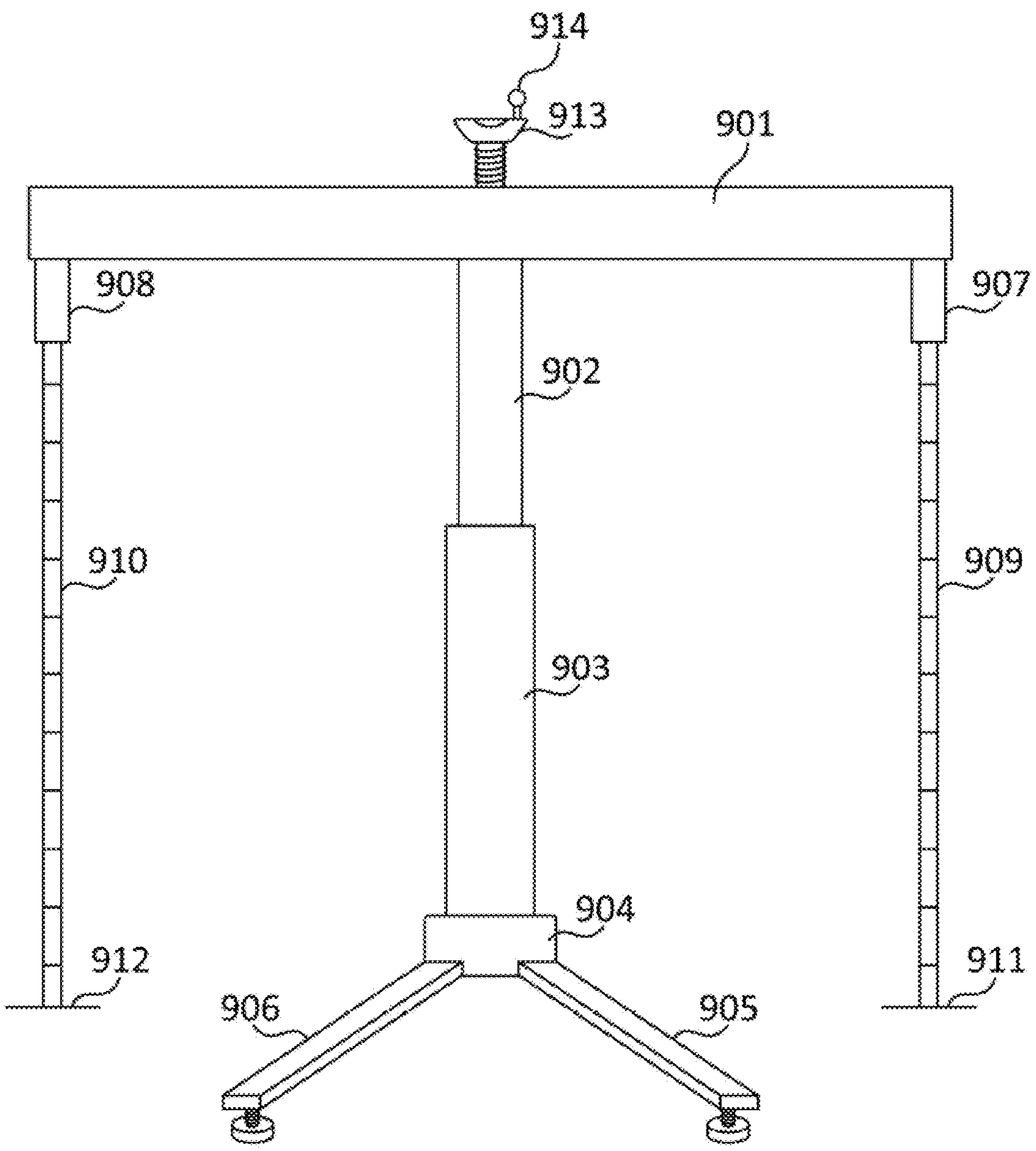
FIG. 9 is an illustrative diagram of the components of a mobile calibration stand used to adjust the height of the stand.

FIG. 9 is an illustrative diagram of the components of a mobile calibration stand used to adjust the height of the stand. The tape measures 907 and 908, which may correspond to the tape measures 424 and 425 in FIG. 4, can be extended to the ground 911 and 912 to measure the height of the upper support member 901, which may correspond to the upper support member 406, 407, and 408 in FIG. 4. The handle 914 can be used to turn the adjustment knob 913, which may correspond to the adjustment knob 403 in FIG. 4, to turn the adjustment screw (not pictured) to move the inner vertical support member 902 within the outer vertical support member 903 to adjust the height of the upper support member 901. The vertical support members 902 and 903 may correspond respectively to the vertical support members 402 and 401 in FIG. 4. The lower vertical support member may be supported by the tripod base 904, which in turn may be supported by the tripod legs 905 and 906. The tripod components 904, 905, and 906 may correspond respectively to tripod components 417, 418, and 419 in FIG. 4. The adjustment of the height can be controlled by the measurement readings 909 and 910 given at the respective tape measures 907 and 908. Two measurements that are both the same desired height can indicate that the upper support 901 is level and at the desired height from the ground.

Figure 10A:
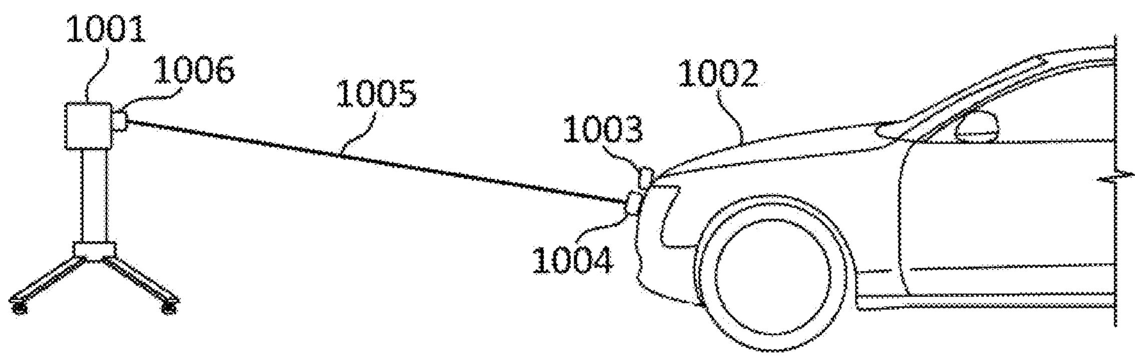
FIG. 10A is an illustrative diagram of the components of a mobile calibration stand used to adjust the alignment of the stand with an automobile.

FIG. 10A is an illustrative diagram of the components of a mobile calibration stand used to adjust the alignment of the stand with an automobile. A holder 1006 with a retractable filament 1005 can be attached to the calibration stand 1001. The filament can be made, for example, from nylon or steel. The end of the filament can be attached to the vehicle 1002 at the hood and can use a hood ornament or decoration 1003 to locate the center of the vehicle 1002. Note that the filament 1005 may sag due to gravity (not shown), but this does not interfere with the function of adjusting the center alignment. The material used for the filament 1005 may be chosen to be lightweight so as to minimize this sagging.

Figure 10B:
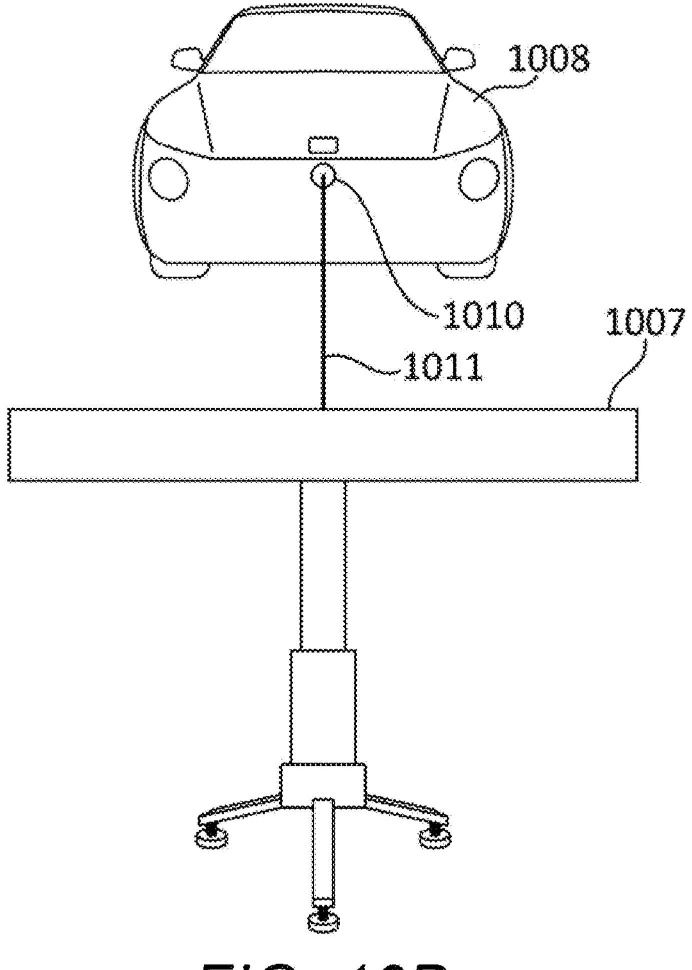
FIG. 10B is an illustrative diagram of the view, from the calibration stand, of the components used to adjust the alignment of the stand with an automobile.

FIG. 10B is an illustrative diagram of the view, from the calibration stand, of the components used to adjust the alignment of the stand with an automobile. Once the filament 1011, which may correspond to the filament 1005 in FIG. 10A, is attached to the vehicle 1008, which may correspond to the vehicle 1002 in FIG. 10A, using the magnet 1010, which may correspond to the magnet 1004 in FIG. 10A, in the center of the hood as indicated by the hood ornament or decoration 1009, which may correspond to the hood ornament or decoration 1003 in FIG. 10A. When standing behind the calibration stand and looking over the top support 1007, which may correspond to the top support 1001 in FIG. 10A, the viewer can readily observe whether the stand is correctly aligned and oriented with the vehicle, and whether the stand is parallel to the front of the vehicle. The viewer can move the stand to make adjustments based on these observations.

Figure 11A:
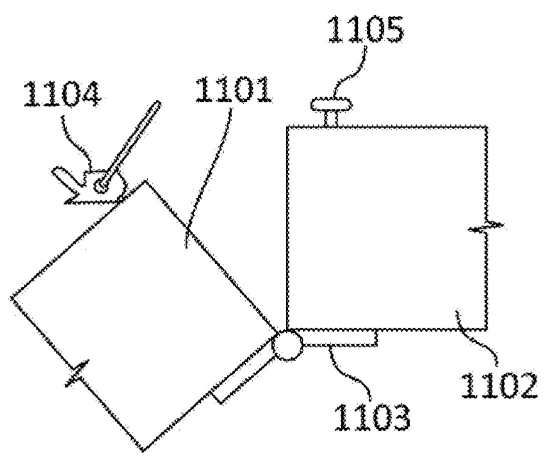
FIG. 11A is an illustrative diagram of a folding component of a calibration stand that is intended to serve as a rigid component while being used for calibration.

FIG. 11A is an illustrative diagram of a folding component of a calibration stand that is intended to serve as a rigid component while being used for calibration. Two pieces 1101 and 1102 of the component can be connected with a hinge 1103 and a toggle latch 1104 on the other side of one piece 1101 and the corresponding hook 1105 on the other side of the second piece 1102.

Figure 11B:
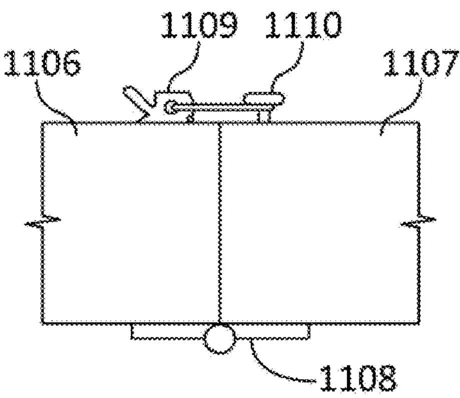
FIG. 11B is an illustrative diagram of a folding component of a calibration stand while it being used as a rigid component for calibration.

FIG. 11B is an illustrative diagram of a folding component of a calibration stand while it being used as a rigid component for calibration. Two pieces 1106 and 1107, which may correspond to the two pieces 1101 and 1102 in FIG. 11A, can be brought together on their flat sides and latched together using the toggle latch 1109, which may correspond to the toggle latch 1104 in FIG. 11A, to connect to the hook 1110, which may correspond to the hook 1105 in FIG. 11A. The hinge 1108, which may correspond to the hinge 1103 in FIG. 11A, can be positioned so that the faces of the two pieces 1106 and 1107 come together smoothly, and the toggle latch assembly 1109 and 1110 can exert a high tension on the joint to hold the two pieces 1106 and 1107 together rigidly. In order for the rigid formation to comprise a straight extensions across the two pieces 1106, 1107, the upper and lower surfaces of the pieces 1106, 1107 must be parallel to one another when the latched together. The function of the hinge 1103, 1108 (and toggle latch 1104, 1109) can be applied to the various hinges 409, 410, 415, 416, 509, 510, 515, 516 previously described with reference to FIGS. 4 and 5.

Figure 11C:
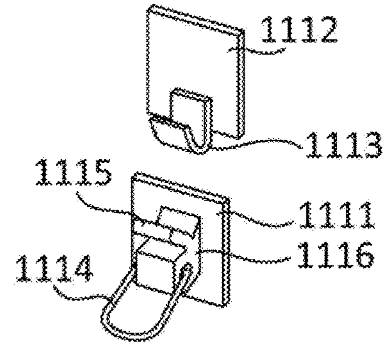
FIG. 11C is an illustrative diagram of a toggle latch used to hold a folding component of a calibration stand in place as a rigid component.

FIG. 11C is an illustrative diagram of a toggle latch used to hold a folding component of a calibration stand in place as a rigid component. The toggle latch assembly depicted in FIG. 11C may correspond to the toggle latch 1104 and hook 1105 in FIG. 11A. The plates 1111 and 1112 can be used to firmly attach the latch and hook to adjoining pieces. The tongue 1114 can be engaged with the hook 1113, and the tab 1115 can be used to exert a large amount of force on the latch body 1116 to tighten the tongue 1114 in the hook 1113. As a result, the entire assembly can exert a high force to hold the two pieces together.

Figure 11D:
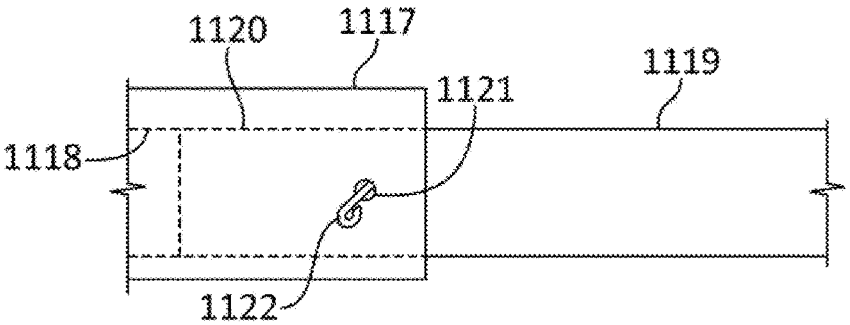
FIG. 11D is an illustrative diagram of an alternate mechanism for providing a rigid component of a calibration stand that can be disassembled for transport.

FIG. 11D is an illustrative diagram of an alternate mechanism for providing a rigid component of a calibration stand that can be disassembled for transport. As an alternative to using a toggle latch as previously depicted in FIGS. 11A-11C, the two pieces 1117 and 1119 can be fashioned so that one piece 1119 fits slidably inside the other piece 1117 along the inner wall 1118. When the overlap 1120 between the two pieces 1117, 1119 is reasonably large, the resulting joint can exert a large amount of force to keep the entire assembly rigid. A hole 1121 can be drilled in the two pieces 1117 and 1119, and a pin 1122 can be inserted in the hole to prevent the two pieces 1117 and 1119 from moving relative to each other. This telescoping fit between the two pieces 1117, 1119 can be applied to the various extensions (upper and lower) of any of the calibration stands previously illustrated and described, e.g. in FIGS. 4 and 5.

Figure 12A:
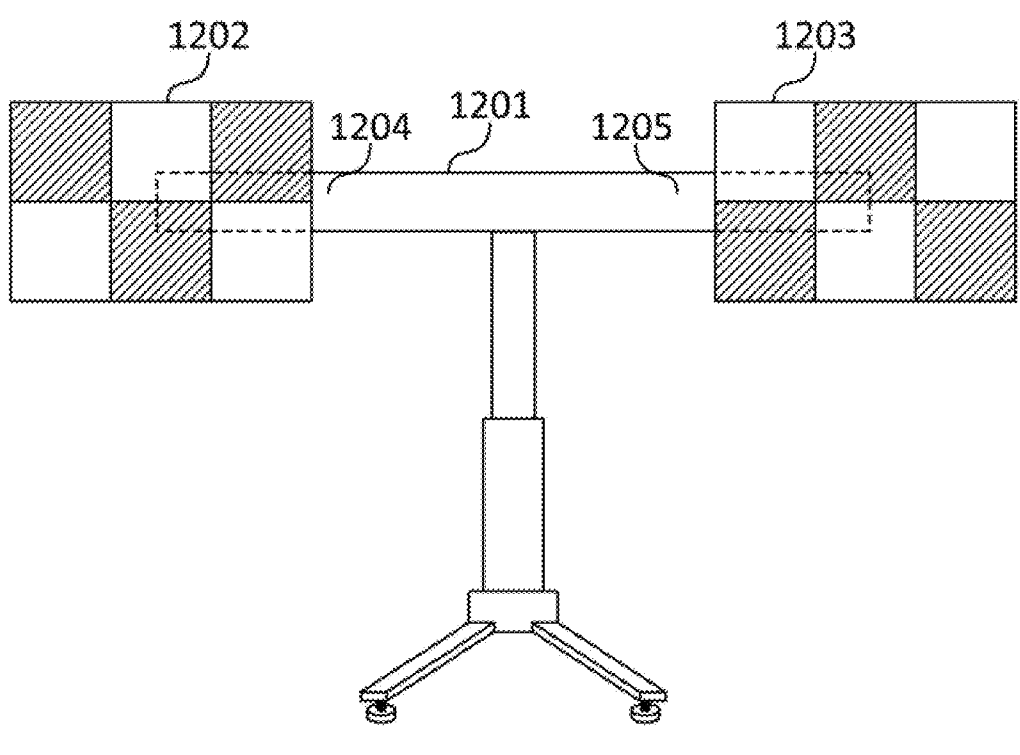
FIG. 12A is an illustrative diagram of the use of a mobile calibration stand to position a calibration target with two components.

FIG. 12A is an illustrative diagram of the use of a mobile calibration stand to position a calibration target with two components. Once the calibration stand is correctly positioned, the upper support member 1201 can be used to mount a calibration target. By way of example, the two arms 1204 and 1205 can have fixed mounts that can accurately position two components 1202 and 1203 of a calibration target. The upper support member 1201 may correspond to the upper support member 406, 407, and 408 in FIG. 4. The arms 1204 and 1205 may correspond respectively to the arms 407 and 406 in FIG. 4. The calibration target components 1202 and 1203 may correspond to the calibration target components 202 and 203 in FIG. 2B.

Figure 12B:
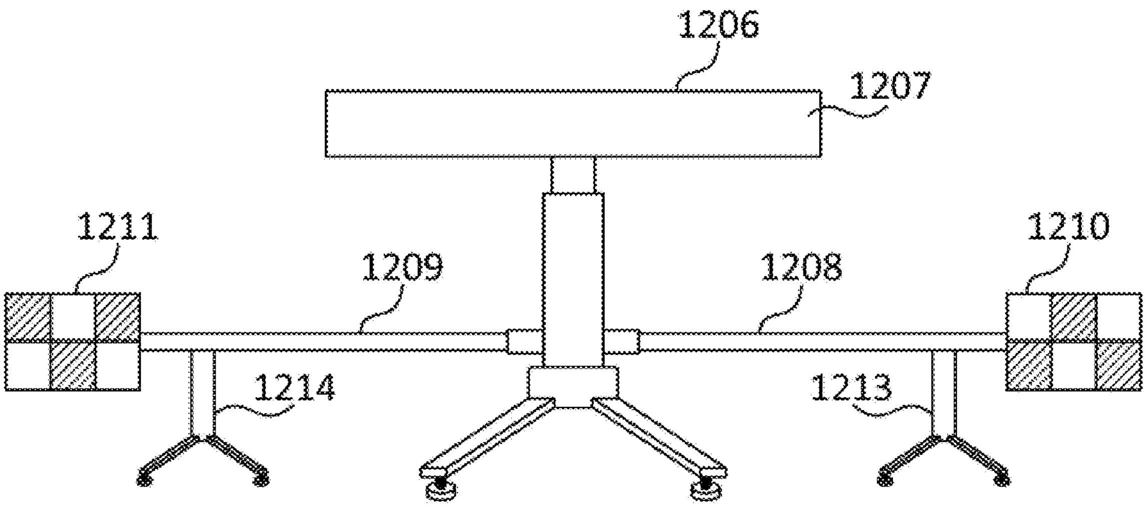
FIG. 12B is an illustrative diagram of the use of a mobile calibration stand to position a calibration target with two components that are widely spaced.

FIG. 12B is an illustrative diagram of the use of a mobile calibration stand to position a calibration target with two components that are widely spaced. If the arm 1207 of the upper support member 1206 is not long enough to achieve the desired spacing of two components of a calibration target, then the lower support arms 1209 and 1208 can be provided with fixed mounts that can accurately position two components 1211 and 1210 of a calibration target. Two additional support tripod bases 1214 and 1213 can be used to stabilize the lower support arms 1209 and 1208 and can provide more accurate placement of the two components 1211 and 1210. The upper support member 1206 may correspond to the upper support member 406, 407, and 408 in FIG. 4. The upper support arm 1207 may correspond to the upper support arm 406 in FIG. 4. The arms 1209 and 1208 may correspond respectively to the arms 412 and 411 in FIG. 4. The calibration target components 1211 and 1210 may correspond to the calibration target components 202 and 203 in FIG. 2B.

Where operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described components and systems can generally be integrated in a single product or packaged into multiple products. In addition, references to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention can be devised without departing from the inventive concept as set forth in the following claims.

What is claimed is:

1. A system for calibrating a camera, comprising:

a calibration stand having a central vertical support, a first horizontal support having a first pair of lockably extended and collapsable extensions, and a first calibration target;

a first configuration of the calibration stand to facilitate the calibrating; and a second configuration of the calibration stand to facilitate transporting the calibration stand;

a retractable filament attached to the first horizontal support at the central vertical support; and a magnet attached to the end of the filament;

wherein the central vertical support is extended in the first configuration and collapsed for the second configuration, each of the first pair of lockably extended and collapsable extensions of the first horizontal support are locked and extended outward in opposing directions from the central vertical support in the first configuration and collapsed toward the central vertical support in the second configuration, and the first calibration target is attached to the first horizontal support on the first pair of extensions in the first configuration and detached from the calibration stand in the second configuration;

wherein the camera is mounted behind a windshield of a vehicle;

wherein the magnet is removably attached to a hood of the vehicle and used to observe whether the calibration stand is correctly aligned and oriented with the vehicle.

2. The system of claim 1, wherein the first pair of lockably extended and collapsable extensions are each connected by a toggle latch and a hinge in the first configuration and the first pair of lockably extended and collapsable extensions are only connected by the hinge with the toggle latch disconnected when collapsed in the second configuration.

3. The system of claim 1, further comprising:

a tripod base supporting the central vertical support including three leg assemblies having a foot comprising an adjustment to change the height of the leg assembly.

4. The system of claim 1, further comprising a leveling mechanism attached to the first horizontal support, comprising at least one bubble level.

5. The system of claim 1, wherein the camera is a sensor for an advanced driver assistance system (ADAS) of the vehicle.

6. The system of claim 1, further comprising:

a secondary tape measure for each of the first pair of lockably extended and collapsable extensions of the first horizontal support;

wherein the secondary tape measure is attached to each of the first pair of lockably extended and collapsable extensions of the first horizontal support in the first configuration and detached from the calibration stand in the second configuration, and a movable end of the secondary tape measure is extended to the ground below the calibration stand to measure the height of the first horizontal support member.

7. The system of claim 1, further comprising:

a second horizontal support having a second pair of lockably extended and collapsable extensions;

wherein the second pair of lockably extended and collapsable extensions are each locked and extended outward in opposing directions from the central vertical support in the first configuration and collapsed toward the central vertical support in the second configuration.

8. The system of claim 7, wherein the second pair of lockably extended and collapsable extensions are each connected by a toggle latch and a hinge in the first configuration and the second pair of lockably extended and collapsable extensions are only connected by the hinge with the toggle latch disconnected when collapsed in the second configuration.

9. The system of claim 7, further comprising:

a second calibration target;

wherein the second calibration target is attached to the second horizontal support on the second pair of extensions for the first configuration and detached from the second horizontal support in the second configuration.

10. The system of claim 7, further comprising:

a primary tape measure; and a tire alignment bracket comprising a vertical alignment member and a horizontal base member;

wherein the primary tape measure is attached to the second horizontal support in the first configuration and detached from the calibration stand in the second configuration, the vertical alignment member is aligned with a tire of the vehicle, the horizontal base member rests on the ground, and a movable end of the primary tape measure is removably attached to the horizontal base member.

* * * * *